(12) United States Patent
Gong et al.

(10) Patent No.: US 11,133,904 B2
(45) Date of Patent: Sep. 28, 2021

(54) INFORMATION SENDING METHOD AND DEVICE AND INFORMATION RECEIVING METHOD AND DEVICE

(71) Applicant: HUAWEI TECHNOLOGIES CO., LTD., Guangdong (CN)

(72) Inventors: Zhengwei Gong, Shanghai (CN); Longbao Wang, Wuhan (CN); Ming Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 146 days.

(21) Appl. No.: 16/235,067

(22) Filed: Dec. 28, 2018

(65) Prior Publication Data

US 2019/0140794 A1 May 9, 2019

Related U.S. Application Data

(63) Continuation of application No. PCT/CN2017/091119, filed on Jun. 30, 2017.

(30) Foreign Application Priority Data

Jun. 30, 2016 (CN) .......................... 201610503837.7

(51) Int. Cl.
*H04L 5/00* (2006.01)
*H04B 7/06* (2006.01)
*H04L 1/00* (2006.01)

(52) U.S. Cl.
CPC ......... *H04L 5/0046* (2013.01); *H04B 7/0697* (2013.01); *H04L 1/0003* (2013.01);
(Continued)

(58) Field of Classification Search
CPC ... H04L 5/0046; H04L 1/0003; H04L 1/0061; H04L 1/0065; H04L 1/0071; H04L 5/00
See application file for complete search history.

(56) References Cited

U.S. PATENT DOCUMENTS

2008/0316977 A1 12/2008 Malladi
2011/0261775 A1* 10/2011 Kim ...................... H04L 1/0057
370/329

(Continued)

FOREIGN PATENT DOCUMENTS

CN 1889545 A 1/2007
CN 1909538 A 2/2007
(Continued)

OTHER PUBLICATIONS

International Search Report dated Sep. 5, 2017 in corresponding International Patent Application No. PCT/CN2017/091119 (7 pages).

(Continued)

*Primary Examiner* — Curtis B Odom
(74) *Attorney, Agent, or Firm* — Kilpatrick Townsend & Stockton LLP

(57) ABSTRACT

An information sending method and device are provided, which include: obtaining M pieces of code block information corresponding to one codeword; performing the following processing on each of the M pieces of code block information to obtain N layers of output bit information: obtaining a quantity K of layers corresponding to one piece of the M pieces of code block information; obtaining a quantity of bits output after rate matching is performed on the one piece of code block information; and obtaining K layers of output bit information of the one piece of code block information based on the quantity of layers corresponding to the one piece of code block information and the quantity of bits output after rate matching is performed on the one piece of code block information; and modulating the N layers of output bit information and sending the modulated N layers of output bit information.

10 Claims, 7 Drawing Sheets

(52) U.S. Cl.
CPC .......... *H04L 1/0061* (2013.01); *H04L 1/0065* (2013.01); *H04L 1/0071* (2013.01); *H04L 5/00* (2013.01)

(56) References Cited

U.S. PATENT DOCUMENTS

2011/0280222 A1\* 11/2011 Nam .................... H04L 1/0083
370/335
2013/0064228 A1   3/2013 Jang et al.
2013/0114391 A1   5/2013 Jang et al.
2014/0153484 A1   6/2014 Kim et al.

FOREIGN PATENT DOCUMENTS

| | | |
|---|---|---|
| CN | 101743711 A | 6/2010 |
| CN | 102594492 A | 7/2012 |
| CN | 104283630 A | 1/2015 |
| CN | 105281868 A | 1/2016 |
| CN | 105306166 A | 2/2016 |
| EP | 3363133 A1 | 8/2018 |
| WO | 2017076336 A1 | 5/2017 |

OTHER PUBLICATIONS

Written Opinion by the International Searching Authority dated Sep. 5, 2017 in corresponding International Patent Application No. PCT/CN2017/091119 (4 pages).

International Search Report, dated Sep. 5, 2017, in International Application No. PCT/CN2017/091119 (4 pp.).

\* cited by examiner

INFORMATION SENDING METHOD AND DEVICE AND INFORMATION RECEIVING METHOD AND DEVICE

CROSS-REFERENCE TO RELATED APPLICATIONS

This application is a continuation of International Application No. PCT/CN2017/091119, filed on Jun. 30, 2017, which claims priority to Chinese Patent Application No. 201610503837.7, filed on Jun. 30, 2016. The disclosures of the aforementioned applications are hereby incorporated by reference in their entireties.

TECHNICAL FIELD

The present disclosure relates to the field of communications technologies, and in particular, to an information sending method and device and an information receiving method and device.

BACKGROUND

In a Long Term Evolution (Long Term Evolution, LTE) system, during information transmission between devices, an original bitstream of information may be processed as a codeword (Codeword, CW) for subsequent transmission. One codeword may be corresponding to one transport block (Transport Block, TB). For example, a sending device performs check coding on an original information bit of one codeword, segments the codeword into code blocks according to a transport block size, performs processes such as check coding, channel coding, and rate matching on all the code blocks of the codeword to obtain bitstreams, performs serial concatenation on the bitstreams, and then modulates a bitstream obtained after the serial concatenation and maps the bitstream to a resource.

In other words, in the LTE system, serial concatenation is sequentially performed on a plurality of code blocks, and a bit stream obtained after the serial concatenation is modulated and mapped. As a result, a single code block is usually mapped to resource elements (Resource Element, RE) that are relatively centralized in time domain and frequency domain, resulting in a relatively low time domain diversity gain or a relatively low frequency domain diversity gain.

SUMMARY

Embodiments of the present invention provide an information sending method and device and an information receiving method and device, to improve a time domain diversity gain and/or a frequency domain diversity gain of code block mapping.

According to a first aspect, an information sending method is provided, and the method includes:

obtaining M pieces of to-be-sent code block information corresponding to one codeword, where M is a positive integer; performing the following processing on each of the M pieces of code block information to obtain N layers of output bit information: obtaining a quantity K of layers corresponding to one piece of code block information; obtaining a quantity of bits output after rate matching is performed on the one piece of code block information; and obtaining K layers of output bit information of the one piece of code block information based on the quantity of layers corresponding to the one piece of code block information and the quantity of bits output after rate matching is performed on the one piece of code block information, where N is an integer greater than 1; and modulating the N layers of output bit information and sending the modulated N layers of output bit information.

In this embodiment of the present invention, the M pieces of code block information belonging to the codeword may be processed to obtain the N layers of output bit information, and then the N layers of output bit information are modulated and mapped. Compared with a prior-art manner in which one piece of code block information is sequentially mapped to adjacent resource elements, in this embodiment of the present invention, bits in a single piece of code block information may be mapped to resource elements that are more distributed, thereby improving a time domain diversity gain and/or a frequency domain diversity gain of code block mapping.

With reference to the first aspect, in a first possible implementation of the first aspect, the obtaining a quantity K of layers corresponding to one piece of code block information may be implemented in the following manner: obtaining, based on the quantity N of layers corresponding to the M pieces of code block information and M, the quantity K of layers corresponding to the one piece of code block information.

A manner of obtaining the quantity of layers corresponding to the one piece of code block information is provided, and K may be obtained in this relatively simple manner.

With reference to the first possible implementation of the first aspect, in a second possible implementation of the first aspect, the obtaining, based on the quantity N of layers corresponding to the M pieces of code block information and M, the quantity K of layers corresponding to the one piece of code block information may be implemented by using the following formula:

$$\begin{cases} \lfloor \frac{N}{M} \rfloor, & 0 \leq r \leq M - N \% M - 1 \\ \lceil \frac{N}{M} \rceil, & M - N \% M - 1 < r < N \end{cases},$$

where r represents an index of the one piece of code block information.

A specific calculation formula for obtaining, based on the quantity N of layers corresponding to the M pieces of code block information and M, the quantity K of layers corresponding to the one piece of code block information is provided, so that K can be obtained by using the formula, and it can be seen that this formula is relatively simple and relatively easy to implement.

With reference to the first aspect, or the first possible implementation or the second possible implementation of the first aspect, in a third possible implementation of the first aspect, the obtaining a quantity of bits output after rate matching is performed on the one piece of code block information may be implemented in the following manner: obtaining, based on the quantity of layers corresponding to the one piece of code block information, a quantity of spatial multiplexing layers, a modulation order of one layer corresponding to the one piece of code block information, and a quantity of resource elements occupied by the codeword to which the one piece of code block information belongs, the quantity of bits output after rate matching is performed on the one piece of code block information.

A manner of obtaining the quantity of bits output after rate matching is performed on the one piece of code block information is provided.

With reference to the third possible implementation of the first aspect, in a fourth possible implementation of the first aspect, the obtaining, based on the quantity of layers corresponding to the one piece of code block information, a quantity of spatial multiplexing layers, a modulation order of one layer corresponding to the one piece of code block information, and a quantity of resource elements occupied by the codeword to which the one piece of code block information belongs, the quantity of bits output after rate matching is performed on the one piece of code block information may be implemented by using the following formula:

$$E_r = K \cdot N_L \cdot Q_{SM} \cdot N_{RE}, \text{ where}$$

$E_r$ represents the quantity of bits output after rate matching is performed on the one piece of code block information, K represents the quantity of layers corresponding to the one piece of code block information, $N_L$ represents the quantity of spatial multiplexing layers, $Q_{SM}$ represents the modulation order of the one layer corresponding to the one piece of code block information, and $N_{RE}$ represents the quantity of resource elements occupied by the codeword to which the one piece of code block information belongs.

A specific calculation formula for obtaining the quantity of bits output after rate matching is performed on the one piece of code block information is provided. The quantity of bits output after rate matching is performed on the one piece of code block information can be obtained by using this formula, and the quantity of bits output after rate matching is performed on the one piece of code block information is relatively accurate when being obtained by using this formula.

With reference to any one of the first aspect, and the first possible implementation to the fourth possible implementation of the first aspect, in a fifth possible implementation of the first aspect, the obtaining K layers of output bit information of the one piece of code block information based on the quantity of layers corresponding to the one piece of code block information and the quantity of bits output after rate matching is performed on the one piece of code block information may be implemented in the following manner: obtaining an $m^{th}$ layer of output bit information in the K layers of output bit information of the one piece of code block information according to the following formula, to obtain the K layers of output bit information, where m is an integer ranging from 0 to K−1:

$$B = \{b_{m+n \cdot K}\}, \text{ where}$$

B represents the $m^{th}$ layer of output bit information of the one piece of code block information, m represents an index of a layer corresponding to the one piece of code block information, m=0, . . . , or K−1, $b_{m+n \cdot K}$ represents an $(m+n \cdot K)^{th}$ output bit to be mapped to an $m^{th}$ layer after rate matching is performed on the one piece of code block information, n=0, . . . , $$\frac{E_r}{K} - 1,$$

or K represents the quantity of layers corresponding to the one piece of code block information, and $E_r$ represents the quantity of bits output after rate matching is performed on the one piece of code block information.

According to a second aspect, another information sending method is provided, and the method includes:

obtaining M pieces of to-be-sent code block information corresponding to one codeword, where M is a positive integer; concatenating bitstreams obtained after rate matching is performed on the M pieces of code block information, to obtain a first bitstream; inputting the first bitstream to an interleaver; obtaining N layers of output bit information output by the interleaver based on the first bitstream, where N is an integer greater than 1; and modulating the N layers of output bit information and sending the modulated N layers of output bit information.

This embodiment of the present invention provides the another information sending method, and in this information sending method, the N layers of output bit information may be obtained after the M pieces of code block information belonging to the codeword are concatenated and input to the interleaver, and then the N layers of output bit information are modulated and mapped. This information sending manner is relatively simple and easy to implement. Compared with a prior-art manner in which one piece of code block information is sequentially mapped to adjacent resource elements, in this embodiment of the present invention, bits in a single piece of code block information may be mapped to resource elements that are more distributed, thereby improving a time domain diversity gain and/or a frequency domain diversity gain of code block mapping.

According to a third aspect, an information receiving method is provided, and the method includes: receiving a signal sent by an information sending device; obtaining N layers of output bit information based on the received signal; and processing the N layers of output bit information to obtain M pieces of code block information.

In this embodiment of the present invention, the information sending device performs superposition modulation after the M pieces of code block information are mapped to a plurality of layers, so that an information receiving device can perform decoding in an iterative decoding manner, thereby improving system performance. This decoding manner helps improve an error correction capability, thereby improving system performance. According to theories such as an information theory and a decoding principle, superposition modulation is performed after M pieces of code block information are mapped to different layers, and content of a plurality of code block information is mapped to a same resource element. In this case, when the information receiving device performs demodulation, some extra mutual information may exist between the different pieces of code block information mapped to the same resource element, and iterative decoding performance of the information receiving device may be better by using the mutual information.

With reference to the third aspect, in a first possible implementation of the third aspect, the processing the N layers of output bit information to obtain M pieces of code block information may be implemented in the following manner: determining, based on an index corresponding to each of N layers and indexes corresponding to the M pieces of code block information, output bit information corresponding to the M pieces of code block information; and processing the output bit information corresponding to the M pieces of code block information to obtain the M pieces of code block information.

An index of each of the M pieces of code block information and the index of each of the N layers may be sent by the information sending device to the information receiving device. For example, the information sending device may add a corresponding index to output bit information and send the output bit information to the information receiving device, or the information sending device may send the indexes of the code block information and the indexes of the layers to the information receiving device by using other information. Alternatively, the index of each of the M pieces of code block information and the index of each of the N layers may be pre-agreed between the information sending device and the information receiving device, may be specified in a protocol or a standard, or the like. The information receiving device can restore the M pieces of code block information based on corresponding indexes. This manner is relatively simple and easy to implement.

With reference to the third aspect, in a second possible implementation of the third aspect, the processing the N layers of output bit information to obtain M pieces of code block information may be implemented in the following manner: performing de-interleaving processing on the N layers of output bit information to obtain a first bitstream, where the first bitstream is obtained by concatenating bitstreams obtained after rate matching is performed on the M pieces of code block information; and obtaining the M pieces of code block information based on the first bitstream.

The information receiving device may obtain the first bitstream only by performing de-interleaving processing on the N layers of output bit information. Which output bit information in the first bitstream is corresponding to which code block information, namely, a correspondence between output bit information and code block information may be carried in the first bitstream, may be pre-agreed between the information sending device and the information receiving device, or may be specified in a protocol or a standard. In conclusion, the information receiving device may obtain the M pieces of code block information based on the first bitstream and the correspondence between output bit information and code block information.

It can be learned that regardless of whether the information is sent according to the method in the first aspect or according to the method in the second aspect, the information may be received according to the method provided in the third aspect.

According to a fourth aspect, a first information sending device is provided, and the device may include a processor and a transmitter. The processor is configured to: obtain M pieces of to-be-sent code block information corresponding to one codeword, where M is a positive integer; and perform the following processing on each of the M pieces of code block information to obtain N layers of output bit information: obtaining a quantity K of layers corresponding to one piece of code block information; obtaining a quantity of bits output after rate matching is performed on the one piece of code block information; and obtaining K layers of output bit information of the one piece of code block information based on the quantity of layers corresponding to the one piece of code block information and the quantity of bits output after rate matching is performed on the one piece of code block information, where N is an integer greater than 1. The transmitter is configured to: modulate the N layers of output bit information obtained by the processor and send the modulated N layers of output bit information.

With reference to the fourth aspect, in a first possible implementation of the fourth aspect, that the processor obtains a quantity K of layers corresponding to one piece of code block information may be implemented in the following manner: obtaining, based on the quantity N of layers corresponding to the M pieces of code block information and M, the quantity K of layers corresponding to the one piece of code block information.

With reference to the first possible implementation of the fourth aspect, in a second possible implementation of the fourth aspect, that the processor obtains, based on the quantity N of layers corresponding to the M pieces of code block information and M, the quantity K of layers corresponding to the one piece of code block information may be implemented by using the following formula:

$$\begin{cases} \lfloor \frac{N}{M} \rfloor, & 0 \le r \le M - N \% M - 1 \\ \lceil \frac{N}{M} \rceil, & M - N \% M - 1 < r < N \end{cases},$$

where
r represents an index of the one piece of code block information.

With reference to the fourth aspect, or the first possible implementation or the second possible implementation of the fourth aspect, in a third possible implementation of the fourth aspect, that the processor obtains a quantity of bits output after rate matching is performed on the one piece of code block information may be implemented in the following manner: obtaining, based on the quantity of layers corresponding to the one piece of code block information, a quantity of spatial multiplexing layers, a modulation order of one layer corresponding to the one piece of code block information, and a quantity of resource elements occupied by the codeword to which the one piece of code block information belongs, the quantity of bits output after rate matching is performed on the one piece of code block information.

With reference to the third possible implementation of the fourth aspect, in a fourth possible implementation of the fourth aspect, that the processor obtains, based on the quantity of layers corresponding to the one piece of code block information, a quantity of spatial multiplexing layers, a modulation order of one layer corresponding to the one piece of code block information, and a quantity of resource elements occupied by the codeword to which the one piece of code block information belongs, the quantity of bits output after rate matching is performed on the one piece of code block information may be implemented by using the following formula:

$E_r = K \cdot N_L \cdot Q_{SM} \cdot N_{RE}$, where $E_r$ represents the quantity of bits output after rate matching is performed on the one piece of code block information, K represents the quantity of layers corresponding to the one piece of code block information, $N_L$ represents the quantity of spatial multiplexing layers, represents the modulation order of the one layer corresponding to the one piece of code block information, and $N_{RE}$ represents the quantity of resource elements occupied by the codeword to which the one piece of code block information belongs.

With reference to any one of the fourth aspect, and the first possible implementation to the fourth possible implementation of the fourth aspect, in a fifth possible implementation of the fourth aspect, that the processor obtains K layers of output bit information of the one piece of code block information based on the quantity of layers corresponding to the one piece of code block information and the quantity of bits output after rate matching is performed on the one piece of code block information may be implemented in the following manner: obtaining an $m^{th}$ layer of output bit information in the K layers of output bit information of the one piece of code block information according to the following formula, to obtain the K layers of output bit information, where m is an integer ranging from 0 to K−1:

$$B=\{b_{m+n\cdot K}\}, \text{where}$$

B represents the $m^{th}$ layer of output bit information of the one piece of code block information, m represents an index of a layer corresponding to the one piece of code block information, m=0, . . . , or K−1, $b_{m+n\cdot K}$ represents an $(m+n\cdot K)^{th}$ output bit to be mapped to an $m^{th}$ layer after rate matching is performed on the one piece of code block information, n=0, . . . , or $$\frac{E_r}{K}-1,$$

K represents the quantity of layers corresponding to the one piece of code block information, and $E_r$ represents the quantity of bits output after rate matching is performed on the one piece of code block information.

According to a fifth aspect, a second information sending device is provided, and the device includes a processor and a transmitter. The processor is configured to: obtain M pieces of to-be-sent code block information corresponding to one codeword, where M is a positive integer; concatenate bitstreams obtained after rate matching is performed on the M pieces of code block information, to obtain a first bitstream; input the first bitstream to an interleaver; and obtain N layers of output bit information output by the interleaver based on the first bitstream, where N is an integer greater than 1. The transmitter is configured to: modulate the N layers of output bit information and send the modulated N layers of output bit information.

According to a sixth aspect, a first information receiving device is provided, and the device includes a receiver and a processor. The receiver is configured to receive a signal sent by an information sending device. The processor is configured to: obtain N layers of output bit information based on the signal received by the receiver, and process the N layers of output bit information to obtain M pieces of code block information.

With reference to the sixth aspect, in a first possible implementation of the sixth aspect, that the processor processes the N layers of output bit information to obtain M pieces of code block information may be implemented in the following manner: determining, based on an index corresponding to each of N layers and indexes corresponding to the M pieces of code block information, output bit information corresponding to the M pieces of code block information; and processing the output bit information corresponding to the M pieces of code block information to obtain the M pieces of code block information.

With reference to the sixth aspect, in a second possible implementation of the sixth aspect, that the processor processes the N layers of output bit information to obtain M pieces of code block information may be implemented in the following manner: performing de-interleaving processing on the N layers of output bit information to obtain a first bitstream, where the first bitstream is obtained by concatenating bitstreams obtained after rate matching is performed on the M pieces of code block information; and obtaining the M pieces of code block information based on the first bitstream.

According to a seventh aspect, a third information sending device is provided, and the device may include a module configured to perform the method according to any one of the first aspect and the possible implementations of the first aspect.

According to an eighth aspect, a fourth information sending device is provided, and the device may include a module configured to perform the method according to any one of the second aspect and the possible implementations of the second aspect.

According to a ninth aspect, a second information receiving device is provided, and the device may include a module configured to perform the method according to any one of the third aspect and the possible implementations of the third aspect.

According to a tenth aspect, a communications apparatus is provided. The communications apparatus may be the information sending device in the foregoing method design, or may be a chip, a circuit, or a board disposed in the information sending device. The communications apparatus includes: a memory configured to store an instruction or a program, a communications interface, and a processor. The processor is coupled to the memory and the communications interface. When the processor executes the instruction or the program, the method performed by the information sending device in any one of the first aspect and the possible designs of the first aspect, or any one of the second aspect and the possible designs of the second aspect is implemented.

According to an eleventh aspect, a communications apparatus is provided. The communications apparatus may be the information receiving device in the foregoing method design, or may be a chip, a circuit, or a board disposed in the information receiving device. The communications apparatus includes: a memory configured to store an instruction or code, a communications interface, and a processor. The processor is coupled to the memory and the communications interface. When the processor executes the instruction or the code, the method performed by the information receiving device in any one of the third aspect and the possible designs of the third aspect is implemented.

According to a twelfth aspect, a computer storage medium is provided, configured to store a computer software instruction used by the information sending device described in the fourth aspect, the information sending device described in the seventh aspect, or the communications apparatus described in the tenth aspect. The computer storage medium includes a program designed for the information sending device to execute any one of the first aspect and the possible designs of the first aspect.

According to a thirteenth aspect, a computer storage medium is provided, configured to store a computer software instruction used by the information sending device described in the fifth aspect, the information sending device described in the eighth aspect, or the communications apparatus described in the tenth aspect. The computer storage medium includes a program designed for the information sending device to execute any one of the second aspect and the possible designs of the second aspect.

According to a fourteenth aspect, a computer storage medium is provided, configured to store a computer software instruction used by the information receiving device described in the sixth aspect, the information receiving device described in the ninth aspect, or the communications apparatus described in the eleventh aspect. The computer storage medium includes a program designed for the information receiving device to execute any one of the third aspect and the possible designs of the third aspect.

According to a fifteenth aspect, a computer program product including an instruction is provided, and when the computer program product runs on a computer, a program designed for the information sending device in any one of the first aspect and the possible designs of the first aspect is executed.

According to a sixteenth aspect, a computer program product including an instruction is provided, and when the computer program product runs on a computer, a program designed for the information sending device in any one of the second aspect and the possible designs of the second aspect is executed.

According to a seventeenth aspect, a computer program product including an instruction is provided, and when the computer program product runs on a computer, a program designed for the information receiving device in any one of the third aspect and the possible designs of the third aspect is executed.

According to an eighteenth aspect, an apparatus is provided, configured to perform the method according to any one of the first aspect, the second aspect, the possible designs of the first aspect, and the possible designs of the second aspect.

In the embodiments of the present invention, code block information is processed to obtain N layers of output bit information for further modulation and mapping. Therefore, bits in a single piece of code block information may be mapped to resource elements that are more distributed, thereby improving a time domain diversity gain and/or a frequency domain diversity gain of code block mapping.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
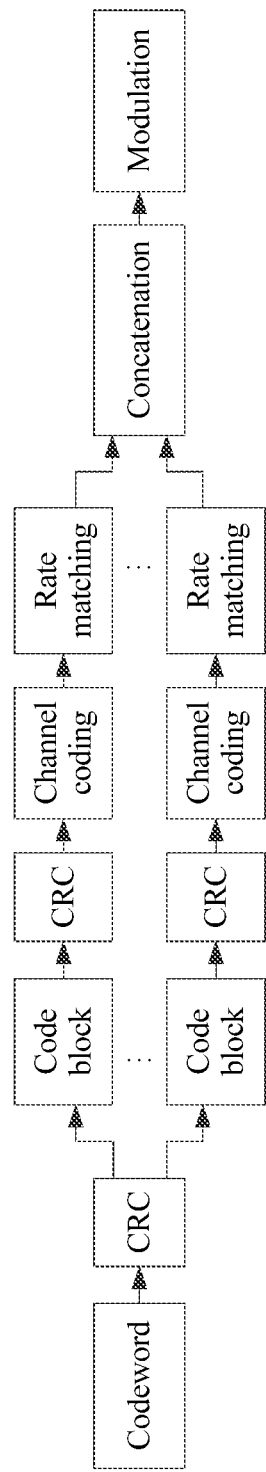
FIG. 1 is a schematic diagram of a codeword mapping process in an LTE system.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the embodiments of the present invention.

The technologies described in this specification may be applied to various communications systems, for example, a 4G or next-generation communications system such as an LTE system, and other communications systems.

The following describes some terms in the embodiments of the present invention, so that a person skilled in the art can have a better understanding.

(1) Codeword: User plane data needs to be processed at a plurality of layers before being sent. Consecutive data streams, generally understood as transport blocks, are processed at a physical layer. The transport blocks usually need to be converted into codewords at the physical layer, and one transport block is usually corresponding to one codeword.

(2) Code block: A transport block is segmented at the physical layer, and each segment obtained after the segmentation is referred to as one code block.

(3) User equipment: The user equipment is a device that provides voice and/or data connectivity for a user, and may include, for example, a handheld device with a wireless connection function or a processing device connected to a wireless modem. The user equipment may communicate with a core network by using a radio access network (Radio Access Network, RAN), and exchange voice and/or data with the RAN. The user equipment (User Equipment, UE) may include a wireless terminal device, a mobile terminal device, a subscriber unit (Subscriber Unit), a subscriber station (Subscriber Station), a mobile station (Mobile Station), a mobile (Mobile) console, a remote station (Remote Station), an access point (Access Point, AP), a remote terminal device (Remote Terminal), an access terminal device (Access Terminal), a user terminal device (User Terminal), a user agent (User Agent), a user device (User Device), or the like. For example, the user equipment may include a mobile phone (or referred to as a "cellular" phone), a computer with a mobile terminal device, or a portable, pocket-sized, handheld, computer built-in, or in-vehicle mobile apparatus. For example, the user equipment is a device such as a personal communications service (Personal Communication Service, PCS) phone, a cordless telephone set, a Session Initiation Protocol (SIP) phone, a wireless local loop (Wireless Local Loop, WLL) station, or a personal digital assistant (Personal Digital Assistant, PDA).

(4) Network device: The network device includes, for example, a base station (for example, an access point), and may be specifically a device that communicates with a wireless terminal device in an air interface in an access network by using one or more sectors. The base station may be configured to mutually convert a received over-the-air frame and a received Internet Protocol (IP) packet, and serve as a router between the wireless terminal device and a remaining part of the access network. The remaining part of the access network may include an IP network. The base station may further coordinate attribute management of the air interface. For example, the base station may be a radio network controller (Radio Network Controller, RNC) or a base station controller (Base Station Controller, BSC), or may be an evolved NodeB (NodeB, eNB, or eNodeB, evolutional NodeB) in an LTE-Advanced (LTE-Advanced, LTE-A) system. This is not limited in the embodiments of the present invention.

(5) The terms "system" and "network" may be used interchangeably in the embodiments of the present invention. "A plurality of" means two or more than two. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects unless specified otherwise.

A codeword mapping process in an LTE system is first described.

Referring to FIG. 1, a sending device adds a cyclic redundancy code (Cyclic Redundancy Code, CRC) to one codeword, segments a transport block to which the CRC is added, to obtain at least one code block, adds a CRC to each code block, performs channel coding (channel coding) on each code block to which the CRC is added, where coding may be performed in a Turbo coding manner, performs rate matching (rate matching) on a coded code block, performs serial concatenation (concatenation) on bitstreams obtained after rate matching, and then modulates a bitstream obtained after the serial concatenation and maps the bitstream to a resource element.

It can be learned that, in the LTE system, serial concatenation is sequentially performed on bitstreams obtained after rate matching is performed on a plurality of code blocks, and a bitstream obtained after the serial concatenation is modulated and mapped. As a result, a single code block is usually mapped to REs that are relatively centralized in time domain and frequency domain, resulting in a relatively low time domain diversity gain and a relatively low frequency domain diversity gain.

The following describes the technical solutions provided in the embodiments of the present invention with reference to the accompanying drawings.

Figure 2:
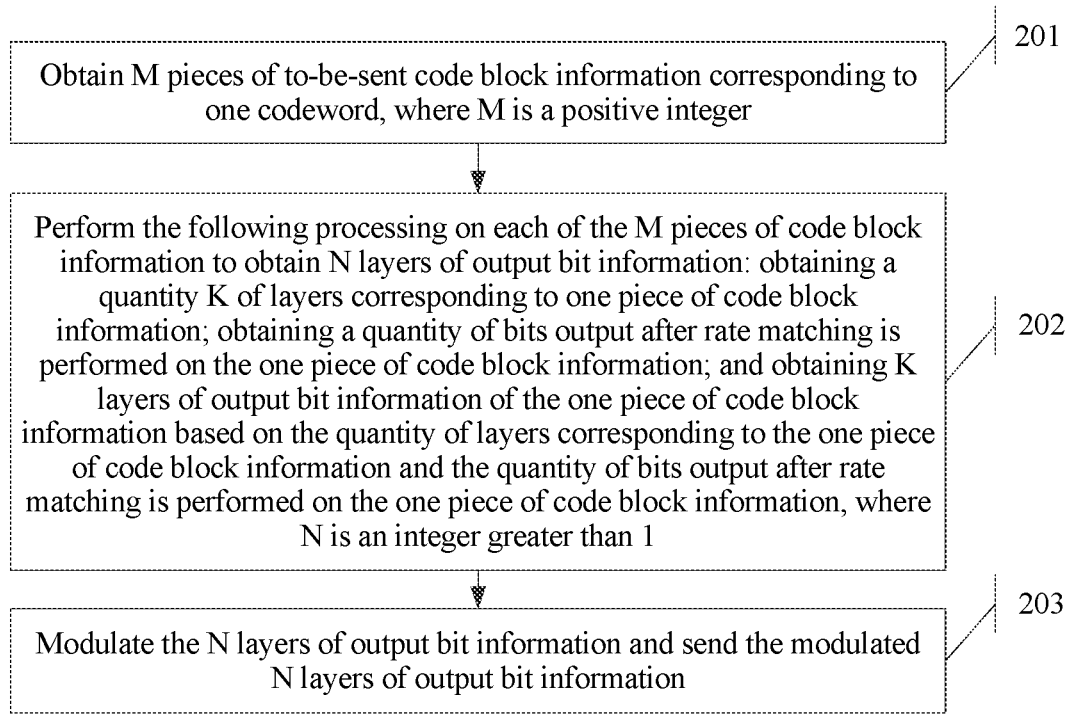
FIG. 2 is a flowchart of a first information sending method according to an embodiment of the present invention.

Referring to FIG. 2, an embodiment of the present invention provides an information sending method, and a procedure of the method is described as follows:

Step 201: Obtain M pieces of to-be-sent code block information corresponding to one codeword, where M is a positive integer.

Step 202: Perform the following processing on each of the M pieces of code block information to obtain N layers of output bit information: obtaining a quantity K of layers corresponding to one piece of code block information; obtaining a quantity of bits output after rate matching is performed on the one piece of code block information; and obtaining K layers of output bit information of the one piece of code block information based on the quantity of layers corresponding to the one piece of code block information and the quantity of bits output after rate matching is performed on the one piece of code block information, where N is an integer greater than 1.

Step 203: Modulate the N layers of output bit information and send the modulated N layers of output bit information.

Serial numbers of the steps in this embodiment of the present invention constitute no limitation on an execution sequence of the steps, and the steps may be performed in any possible sequence.

This embodiment of the present invention constitutes no limitation on a device that performs the information sending method. For example, the device may be user equipment or a network device.

In this embodiment of the present invention, if to-be-sent code block information is corresponding to a plurality of codewords, code block information corresponding to each codeword may be processed according to the method provided in the embodiment shown in FIG. 2. Usually content of different codewords is not mapped to a same layer. In other words, one layer of output bit information usually includes all or a part of content of one codeword other than content of a plurality of codewords. If to-be-sent code block information is corresponding to a plurality of codewords, all the to-be-sent code block information may be corresponding to one user equipment. For example, the device that performs the information sending method may be the user equipment, or the device that performs the information sending method is a network device and a device that receives the sent code block information is the user equipment. Alternatively, all the to-be-sent code block information may be corresponding to at least two user equipments. For example, the device that performs the information sending method is a network device, and devices that receive the sent code block information are the at least two user equipments.

Optionally, a quantity of layers may be determined by using a protocol, or may be determined by a device according to different cases. Different layers are set. The information sending device performs lower-order modulation on code bit information of a single layer, and performs linear superposition processing on lower-order modulated signals of different layers, to obtain a superposed output signal. In other words, the information sending device may perform superposition modulation on signals of different layers, and send a superposed output signal to the information receiving device. In this information transmission method, lower-order modulated signals of different layers are superposed, and iterative decoding is performed on a receiver side, to obtain an iterative decoding gain. In addition, in this manner, during mapping of the code block information to resource elements, a single piece of code block information may be mapped to more resource elements that are more distributed, to improve a time domain diversity gain and/or a frequency domain diversity gain. A concept of the layer herein is not an actual physical concept. To be specific, the layer cannot be understood as an actual "layer", and different layers are merely used to indicate that the code block information is divided into different parts instead of being placed at a "layer". The name "layer" constitutes no limitation on a function of a layer. Certainly, another possible name can be used in an actual application.

Figure 3:
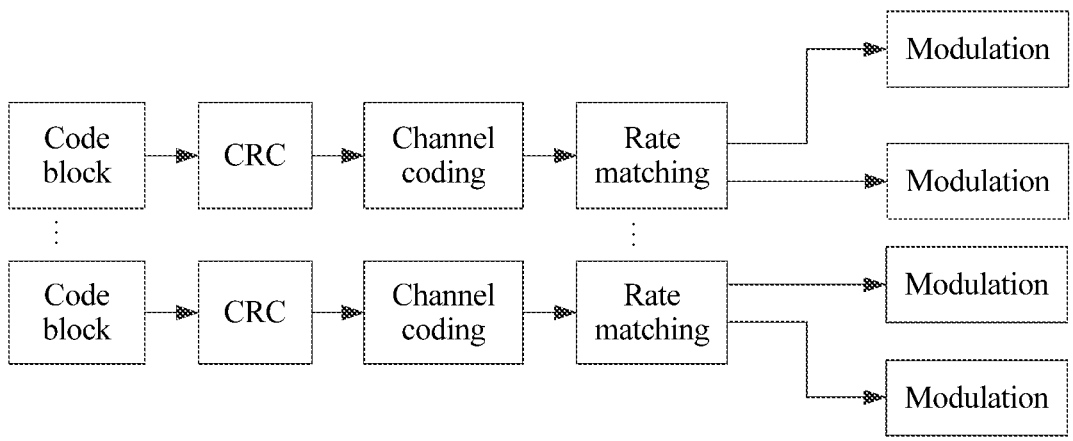
FIG. 3 is a schematic diagram of a first information sending process according to an embodiment of the present invention.

Referring to FIG. 3, FIG. 3 is a schematic diagram of an information sending process according to an embodiment of the present invention. It can be learned from FIG. 3 that, different from the prior art, in this embodiment of the present invention, output bit information output after rate matching is performed on code blocks is mapped to different layers for modulation. In the example of FIG. 3, each code block is mapped to two layers. In other words, each "Modulation" block in the figure represents one layer. In this case, superposition modulation may be performed on modulated symbol sub-streams obtained after modulation is performed at different layers, to implement a superposition modulation function and improve a time domain diversity gain and/or a frequency domain diversity gain. In addition, for a receive end, decoding may be performed in an iterative decoding manner, so that system performance can be improved.

The code block information in this embodiment of the present invention may be information obtained after processing such as encoding and interleaving is performed on a code block. Such processing processes are common processes in the prior art. Therefore, details are not described in this embodiment of the present invention.

M code blocks corresponding to the M pieces of code block information may be obtained by segmenting a transport block corresponding to one codeword, and code blocks corresponding to all the to-be-sent code block information may be obtained by segmenting a transport block corresponding to at least one codeword. In other words, the code blocks corresponding to all the to-be-sent code block information may be from one codeword or may be from a plurality of codewords. If the code blocks corresponding to all the to-be-sent code block information are obtained by segmenting a transport block corresponding to one codeword, all the to-be-sent code block information is corresponding to one user equipment. If the code blocks corresponding to all the to-be-sent code block information are obtained by segmenting transport blocks corresponding to at least two codewords, all the to-be-sent code block information may be corresponding to one user equipment or at least two user equipments.

In this embodiment of the present invention, the M pieces of code block information may be mapped to at least two layers for modulation. If M is greater than or equal to 2, each of the M pieces of code block information may be mapped to one layer, so that one piece of code block information may occupy one layer, or some or all of the M pieces of code block information may be separately mapped to a plurality of layers, so that one piece of code block information may occupy a plurality of layers. However, one layer carries content of only one piece of code block information, for example, may carry a part or all of content of one piece of code block information. If M is 1, the code block information may be mapped to at least two layers for modulation. In this case, one piece of code block information occupies at least two layers, and each layer carries a part of content of the piece of code block information.

For example, if M is 2, and the two pieces of code block information may be mapped to three layers, one of the two pieces of code block information may be mapped to one layer, and the other piece of code block information may be mapped to remaining two layers. In this case, only one piece of code block information needs to be mapped to one layer. For another example, if M is 3, and the three pieces of code block information are mapped to four layers, a first piece of code block information may be mapped to one layer, a second piece of code block information may be mapped to another layer, and a third piece of code block information may be mapped to remaining two layers. In this case, each of two pieces of code block information needs to be mapped to one layer.

In an implementation, if the M pieces of code block information need to be mapped to at least two layers for modulation, before the M pieces of code block information are mapped to the at least two layers for modulation, a quantity of layers to which each of the M pieces of code block information needs to be mapped may be obtained, in other words, how many layers to which each piece of code block information needs to be mapped may be obtained, and a quantity of bits output after rate matching is performed on each of the M pieces of code block information may be obtained. Then output bit information that is of each of the M pieces of code block information and that is to be mapped to each of the at least two layers is obtained based on the obtained quantity of layers to which each of the M pieces of code block information needs to be mapped and the obtained quantity of bits output after rate matching is performed on each of the M pieces of code block information. In other words, in addition to the quantity of layers to which each piece of code block information is to be mapped, the output bit information that is of each piece of code block information and that is to be mapped to each corresponding layer may be determined. In this case, corresponding output bit information may be mapped to the at least two layers for modulation. In this way, each piece of output bit information can be more accurately mapped to a corresponding layer.

For example, r represents an index of one piece of code block information, and output bit information $B_{RM}$ output after rate matching is performed on the code block information r may be represented by $B_{RM,r}$, where RM represents rate matching, and $B_{RM,r}$ may be expressed as follows:

$$B_{RM,r} = \{b_0, b_1, \ldots, b_{E_r-1}\} \quad (1)$$

In Formula (1), $E_r$ is a total quantity of bits output after rate matching is performed on the code block information r.

In an implementation, the quantity of bits output after rate matching is performed on the code block information r may be obtained based on a quantity of layers corresponding to the code block information r, a quantity of spatial multiplexing layers, a modulation order of one layer corresponding to the code block information r, and a quantity of resource elements occupied by a codeword to which the code block information r belongs. In this implementation, the quantity of bits output after rate matching is performed on the code block information r may be obtained by using the following formula:

$$E_r = K \cdot N_L \cdot Q_{SM} \cdot N_{RE} \quad (2)$$

In Formula (2), $E_r$ is the quantity of bits output after rate matching is performed on the code block information r, K is the quantity of layers to which the code block information r needs to be mapped, $N_L$ is the quantity of spatial multiplexing layers, $Q_{SM}$ is the modulation order of the one layer corresponding to the code block information r, where in this sense, modulation orders of the layers corresponding to the code block information r are the same, and $N_{RE}$ is the quantity of resource elements occupied by the codeword to which the code block information r belongs. In addition, modulation orders corresponding to different code block information included in one codeword may be the same or different.

In an implementation, the quantity of layers corresponding to the code block information r may be obtained based on a quantity of layers corresponding to M pieces of code block information and M. The M pieces of code block information belong to one codeword, and therefore a quantity of layers corresponding to the codeword can be determined, in other words, a quantity of layers to which the codeword needs to be mapped is determined. Generally, a quantity of layers corresponding to one codeword can be learned. For example, if the quantity of layers to which the codeword needs to be mapped is represented by N, the quantity of layers to which the code block information r needs to be mapped may be obtained in the following manner:

$$\begin{cases} \lfloor \frac{N}{M} \rfloor, & 0 \le r \le M-N \% M - 1 \\ \lceil \frac{N}{M} \rceil, & M-N \% M - 1 < r < N \end{cases} \quad (3)$$

The obtaining K layers of output bit information of the code block information r based on the quantity of layers corresponding to the code block information r and the quantity of bits output after rate matching is performed on the code block information r may be implemented by using Formula (4). Formula (4) is used to calculate output bit information to be mapped to an $m^{th}$ layer after rate matching is performed on the code block information r, to obtain the K layers of output bit information of the code block information r, where m is an integer ranging from 0 to K−1.

$$B = \{b_{m+n \cdot K}\} \quad (4)$$

B represents the output bit information to be mapped to the $m^{th}$ layer after rate matching is performed on the code block information r, $b_{m+n \cdot K}$ represents an $(m+n \cdot K)^{th}$ output bit to be mapped to the $m^{th}$ layer after rate matching is performed on the code block information r, B is a subset of $B_{RM,r}$ calculated in Formula (1), and n=0, . . . , or $$\frac{E_r}{K} - 1.$$

K is the quantity of layers to which the code block information r needs to be mapped, m is an index of any layer to which the code block information r needs to be mapped, m=0, . . . , or K−1, and m is an integer.

Certainly, the foregoing formulas merely provide a possible manner of obtaining a quantity of layers to which each code block corresponding to one codeword needs to be mapped, output bit information obtained after rate matching is performed on each code block corresponding to the codeword, and output bit information that is of each code block corresponding to the codeword and that is to be mapped to each of at least two layers. Alternatively, the foregoing three types of information may be obtained in another manner, for example, results in the foregoing formulas may be shown in a table. This is not limited in this embodiment of the present invention.

In addition, it can be foreseen that N may be equal to 1 in this embodiment of the present invention, in other words, the solution in this embodiment of the present invention may also be applied to a scenario in which the M pieces of code block information are mapped to one layer.

Figure 4:
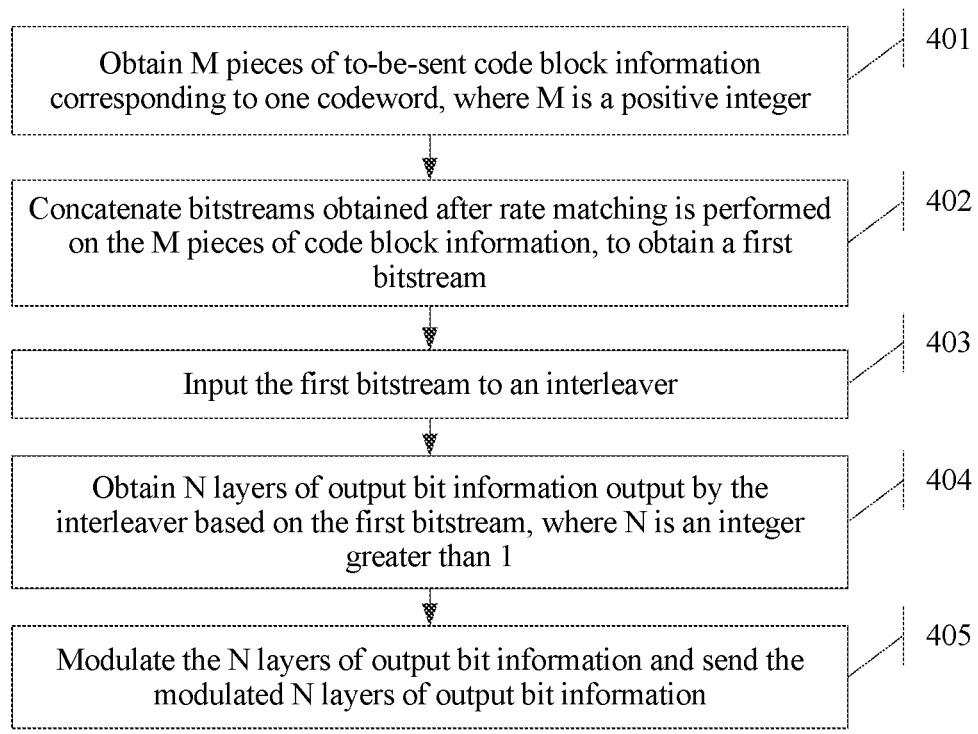
FIG. 4 is a flowchart of a second information sending method according to an embodiment of the present invention.

Referring to FIG. 4, an embodiment of the present invention provides another information sending method as an alternative solution of the information sending method shown in FIG. 2. A procedure of the method is described as follows:

Step 401: Obtain M pieces of to-be-sent code block information corresponding to one codeword, where M is a positive integer.

Step 402: Concatenate bitstreams obtained after rate matching is performed on the M pieces of code block information, to obtain a first bitstream.

Step 403: Input the first bitstream to an interleaver.

Step 404: Obtain N layers of output bit information output by the interleaver based on the first bitstream, where N is an integer greater than 1.

Step 405: Modulate the N layers of output bit information and send the modulated N layers of output bit information.

Serial numbers of the steps in this embodiment of the present invention constitute no limitation on an execution sequence of the steps, and the steps may be performed in any possible sequence.

This embodiment of the present invention constitutes no limitation on a device that performs the information sending method. For example, the device may be user equipment or a network device.

Figure 5:
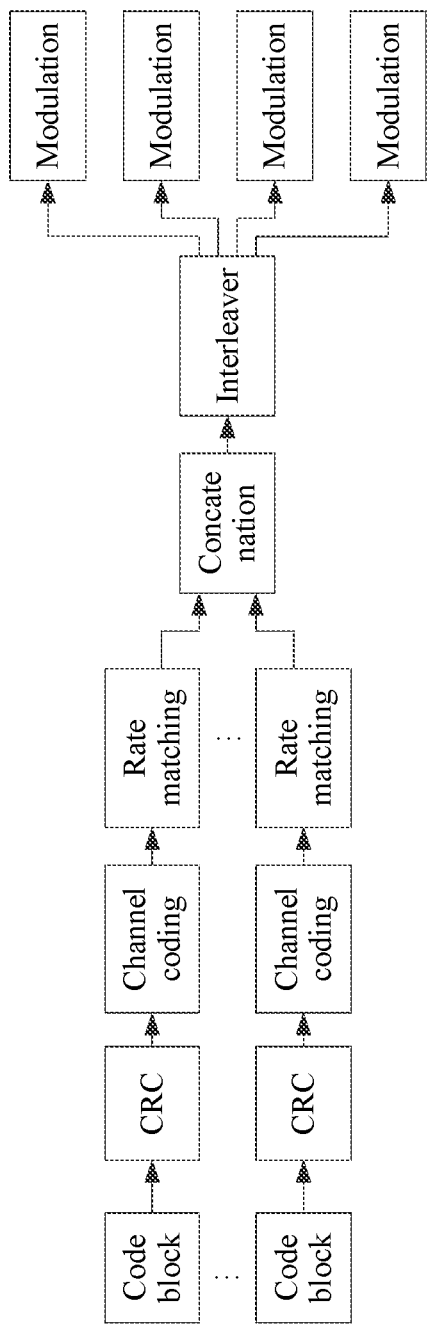
FIG. 5 is a schematic diagram of a process of sending information by using an interleaver according to an embodiment of the present invention.

For a processing process in this embodiment of the present invention, refer to FIG. 5. It can be learned that the interleaver is added in FIG. 5 on the basis of FIG. 2. To be specific, in the manner shown in FIG. 5, the first bitstream is obtained after serial concatenation is performed on the bitstreams on which rate matching is performed, then the first bitstream is input to the interleaver, and the interleaver may output at least two sub-bitstreams. In this embodiment of the present invention, the sub-bitstream is also referred to as output bit information. In other words, the bitstream and the output bit information in this embodiment of the present invention are interchangeable concepts. In the example of FIG. 4, four pieces of output bit information are output, and the output bit information may be separately mapped to different layers for modulation in an output sequence. This mapping manner may be applied to a case in which M is greater than N, to be specific, a case in which a quantity of code blocks corresponding to one codeword is greater than a quantity of layers to which the codeword needs to be mapped, and may also be applied to a case in which M is less than or equal to N, to be specific, a case in which a quantity of code blocks corresponding to one codeword is less than or equal to a quantity of layers to which the codeword needs to be mapped.

The interleaver provided in this embodiment of the present invention may be an interleaver of H rows and N columns in which information is input by row and output by column, where N is a quantity of layers to which the M pieces of code block information need to be mapped, and $$H = \frac{\text{Bit}_C}{N}.$$

$\text{Bit}_C$ is a quantity of bits obtained by performing serial concatenation on output bit information obtained after rate matching is performed on the codeword, namely, a quantity of bits included in the first bitstream. $\text{Bit}_C$ may be equal to a maximum quantity of bits that can be transmitted on a transmission resource used to transmit the codeword. $\text{Bit}_C$ may be considered as a known value. One column of output bit information output by the interleaver is mapped to one layer. Output bit information mapped to an $m^{th}$ layer may be represented by $\{b_{n+m \cdot N}\}$ where n=0, . . . , or N−1, and m is an index of any layer to which the M pieces of code block information need to be mapped.

In this embodiment of the present invention, information can be mapped to a layer by using a relatively simple interleaver without using a relatively complex device, and an implementation is relatively simple. In addition, the interleaver can fully disrupt original bit locations of the code block information, so that a single piece of code block information is mapped to resource elements that are more distributed, thereby improving a time domain diversity gain and/or a frequency domain diversity gain. In addition, the information sending device may implement superposition modulation and mapping through layering. In this way, a system performance gain can be improved.

In this embodiment of the present invention, if to-be-sent code block information is corresponding to a plurality of codewords, code block information corresponding to each codeword may be processed according to the method provided in the embodiment shown in FIG. 2, or may be processed according to the method provided in FIG. 4. Alternatively, if to-be-sent code block information is corresponding to a plurality of codewords, different codewords may be processed in different manners. For example, each of some codewords may be processed according to the method provided in the embodiment shown in FIG. 2, and each of remaining codewords may be processed according to the method provided in the embodiment shown in FIG. 4. This is not limited in this embodiment of the present invention. If M is greater than N, and code block information included in one codeword is processed according to the method provided in the embodiment shown in FIG. 2, a quantity of layers to which some of the code block information is mapped may be 0. Therefore, such code block information may be processed preferably according to the method provided in the embodiment shown in FIG. 4, to avoid, to a greatest extent, a case in which a quantity of layers to which code block information is mapped is 0.

For example, the to-be-sent code block information is corresponding to a plurality of codewords. In the plurality of codewords, a quantity of pieces of code block information included in a codeword 1 is greater than a quantity of layers to which the codeword 1 needs to be mapped, a quantity of pieces of code block information included in a codeword 2 is less than a quantity of layers to which the codeword 2 needs to be mapped, and a quantity of pieces of code block information included in a codeword 3 is equal to a quantity of layers to which the codeword 3 needs to be mapped. In this case, the codeword 2 and the codeword 3 may be mapped according to the method provided in the embodiment shown in FIG. 2, and the codeword 1 is mapped according to the method provided in the embodiment shown in FIG. 4; or all of the codeword 1, the codeword 2, and the codeword 3 may be mapped according to the method provided in the embodiment shown in FIG. 2; or all of the codeword 1, the codeword 2, and the codeword 3 may be mapped according to the method provided in the embodiment shown in FIG. 4.

In addition, it can be foreseen that N may be equal to 1 in this embodiment of the present invention, in other words, the solution in this embodiment of the present invention may also be applied to a scenario in which the M pieces of code block information are output to one layer after being processed by the interleaver.

Both the embodiment shown in FIG. 2 and the embodiment shown in FIG. 4 describe an information sending method. Correspondingly, referring to FIG. 6, an embodiment of the present invention provides an information receiving method. A procedure of the method is described as follows:

Step 601: Receive a signal sent by an information sending device.

Step 602: Obtain N layers of output bit information based on the received signal.

Step 603: Process the N layers of output bit information to obtain M pieces of code block information.

The N layers of output bit information described in this embodiment of the present invention and the N layers of output bit information described in the embodiment shown in FIG. 2 or the N layers of output bit information described in the embodiment shown in FIG. 4 are same output bit information. A same name is used for such characteristic in descriptions of a receive end and a transmit end to reflect consistency.

Figure 6:
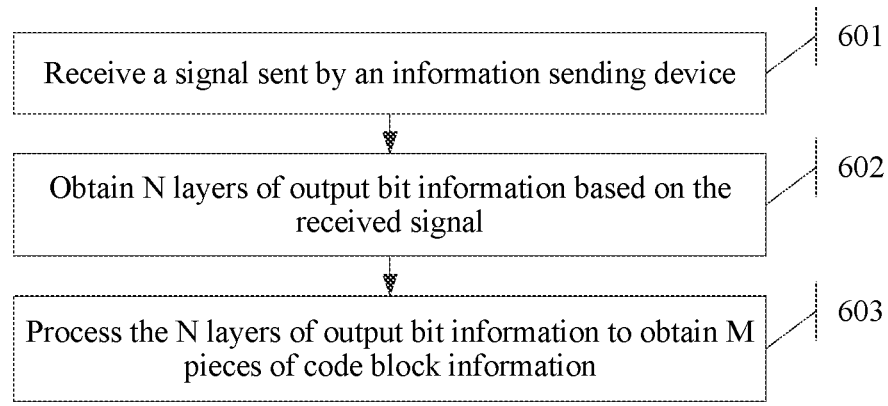
FIG. 6 is a flowchart of an information receiving method according to an embodiment of the present invention.

Regardless of whether the M pieces of code block information are sent according to the method provided in the embodiment shown in FIG. 2 or according to the method provided in the embodiment shown in FIG. 4, the receive end may receive the M pieces of code block information according to the method provided in the embodiment shown in FIG. 6.

Serial numbers of the steps in this embodiment of the present invention constitute no limitation on an execution sequence of the steps, and the steps may be performed in any possible sequence.

This embodiment of the present invention constitutes no limitation on a device that performs the information receiving method. For example, the device may be user equipment or a network device. A determining manner is as follows: If an information sending method is performed by user equipment, the information receiving method may be performed by a network device; or if an information sending method is performed by a network device, the information receiving method may be performed by user equipment.

The information sending device modulates the N layers of output bit information to obtain a modulated symbol stream, and may map the modulated symbol stream to a resource element for sending, so that the information receiving device can receive, on a corresponding resource element, a signal sent by the information sending device. The information receiving device processes the received signal to obtain the N layers of output bit information. The information receiving device may perform processing such as sampling and demodulation on the received signal to obtain all output bit information sent by the information sending device. All the output bit information herein may be output bit information included in one piece of code block information. If the information sending device sends a plurality of pieces of code block information, the information receiving device may process each piece of code block information in the same manner. For a processing manner in which the information receiving device obtains, based on the received signal, all the output bit information sent by the information sending device, refer to the prior art. The information receiving device knows a quantity of layers corresponding to all the bit information sent by the information sending device, and knows output bit information in which locations of all the output bit information is corresponding to which layer. Therefore, the information receiving device may obtain the N layers of output bit information accordingly. Information such as the quantity of layers corresponding to all the bit information sent by the information sending device and output bit information in which locations of all the output bit information is corresponding to which layer may be specified in a protocol, or may be pre-agreed between the information sending device and the information receiving device, or may be sent by the information sending device to the information receiving device. Then the obtained output bit information is restored to the N layers of output bit information, and then the N layers of output bit information are processed to obtain the M pieces of code block information.

If the information sending device is a network device and the information receiving device is user equipment, the network device may send signals to a plurality of user equipments. Any one of the user equipments usually receives the signals sent by the network device to the plurality of user equipments, and the network device notifies the user equipment of received information corresponding to the user equipment. Therefore, although the user equipment receives the signals sent to the plurality of user equipments, the user equipment may process, according to the method provided in this embodiment of the present invention, a signal corresponding to the user equipment, to obtain code block information that needs to be received by the user equipment, and may discard a received signal sent to another user equipment. If the information sending device is user equipment and the information receiving device is a network device, a plurality of user equipments may send signals, namely, modulated output bit information, to the network device. In this case, because a transmission resource and the like used by each user equipment are scheduled by the network device, each user equipment performs independent processing based on scheduling by the network device, and the plurality of user equipments do not need to cooperate with each other. Because scheduling is performed by the network device, the network device knows a transmission resource to which a signal transmitted by each user equipment is mapped. The network device can receive, by using the corresponding transmission resource, the signal sent by each user equipment, and obtain, based on the received signal, code block information sent by each user equipment. The network device may further determine which received code block information is sent by which user equipment.

In an implementation, if the information sending device sends the M pieces of code block information according to the method provided in the embodiment shown in FIG. 2, the processing the N layers of output bit information to obtain the M pieces of code block information may be implemented in the following manner: determining, based on an index corresponding to each of N layers and indexes corresponding to the M pieces of code block information, output bit information corresponding to the M pieces of code block information; and processing the output bit information corresponding to the M pieces of code block information to obtain the M pieces of code block information.

To be specific, each of the M pieces of code block information may be corresponding to an index, and each of the N layers may also be corresponding to an index. In this case, the information receiving device may restore the N layers of output bit information to the M pieces of code block information based on the indexes of the code block information and indexes of the layers. For example, there may be a correspondence between the index of each of the M pieces of code block information and the index of each layer corresponding to the code block information. The correspondence may be specified in a protocol, may be pre-agreed between the information sending device and the information receiving device, or may be sent by the information sending device to the information receiving device. The information receiving device may restore the N layers of output bit information to the M pieces of code block information based on the correspondence, the indexes of the code block information, and the indexes of the layers. For ease of understanding, the following uses an example for description.

For example, M=2, an index of a first piece of code block information is 1, an index of a second piece of code block information is 2, N=3, and the information sending device maps the first piece of code block information to a first layer, and maps the second piece of code block information to a second layer and a third layer. The information sending device and the information receiving device pre-agree on a quantity of layers corresponding to all bit information sent by the information sending device, and also agree on output bit information in which locations of all the obtained output bit information is corresponding to which layer. In this case, after receiving a signal sent by the information sending device, the information receiving device may process the received signal to obtain the original three layers of output bit information. In addition, the information sending device and the information receiving device also pre-agree on the correspondence between the index of each of the M pieces of code block information and the index of each layer corresponding to the code block information. For example, the correspondence is as follows: Code block information whose index is 1 is corresponding to a layer whose index is 1, and code block information whose index is 2 is corresponding to layers whose indexes are 2 and 3. In addition, the information sending device and the information receiving device also agree on indexes of code block information sent by the information sending device, for example, 1 and 2, and agree on the indexes of the N layers, for example, 1, 2, and 3. In this case, after obtaining the three layers of output bit information, the information receiving device may obtain the original two pieces of code block information based on the three layers of output bit information, the correspondence, and the corresponding indexes.

In this implementation, the index of each of the M pieces of code block information and the index of each of the N layers may be sent by the information sending device to the information receiving device. For example, the information sending device may add a corresponding index to output bit information and send the output bit information to the information receiving device, or the information sending device may send the indexes of the code block information and the indexes of the layers to the information receiving device by using other information. Alternatively, the index of each of the M pieces of code block information and the index of each of the N layers may be pre-agreed between the information sending device and the information receiving device, may be specified in a protocol or a standard, or the like.

In an implementation, if the information sending device sends the M pieces of code block information according to the method provided in the embodiment shown in FIG. 3, the processing the N layers of output bit information to obtain the M pieces of bit information may be implemented in the following manner: performing de-interleaving processing on the N layers of output bit information to obtain a first bitstream, where the first bitstream is obtained by concatenating bitstreams obtained after rate matching is performed on the M pieces of code block information; and obtaining the M pieces of code block information based on the first bitstream.

In this implementation, the information receiving device may obtain the first bitstream only by performing de-interleaving processing on the N layers of output bit information. Which output bit information in the first bitstream is corresponding to which code block information, namely, a correspondence between output bit information and code block information may be carried in the first bitstream, may be pre-agreed between the information sending device and the information receiving device, or may be specified in a protocol or a standard. In conclusion, the information receiving device may obtain the M pieces of code block information based on the first bitstream and the correspondence between output bit information and code block information.

In this embodiment of the present invention, superposition modulation is performed after code block information is mapped to a plurality of layers, so that the information receiving device can perform decoding in an iterative decoding manner, thereby improving system performance. This decoding manner helps improve an error correction capability, thereby improving system performance. According to theories such as an information theory and a decoding principle, superposition modulation is performed after M pieces of code block information are mapped to different layers, and content of a plurality of code block information is mapped to a same resource element. In this case, when the information receiving device performs demodulation, some extra mutual information may exist between the different pieces of code block information mapped to the same resource element, and iterative decoding performance of the information receiving device may be better by using the mutual information.

The following describes devices provided in the embodiments of the present invention with reference to the accompanying drawings.

Figure 7:
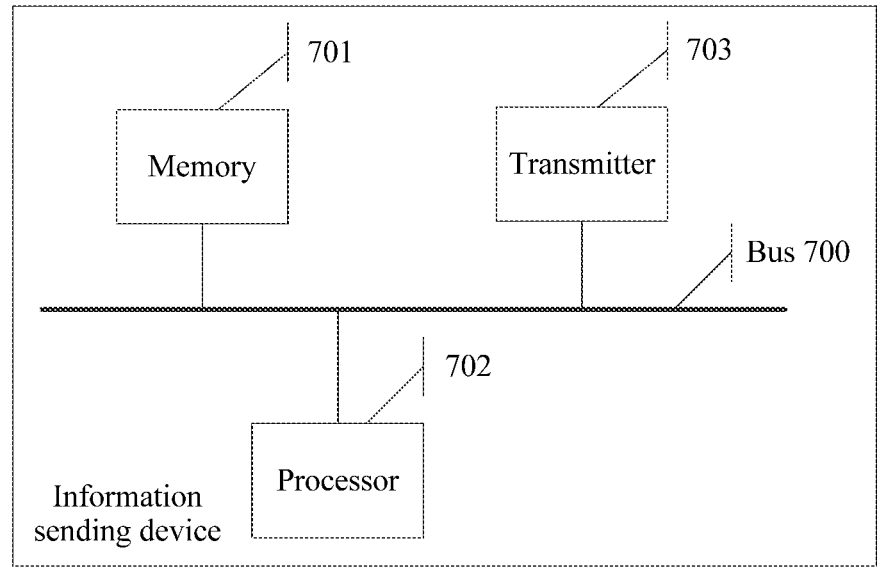
FIG. 7 is a schematic structural diagram of a first information sending device according to an embodiment of the present invention.

Referring to FIG. 7, based on a same invention concept, a first information sending device is provided. The device may be, for example, user equipment or a network device. The device may include a processor 702 and a transmitter 703.

For example, the processor 702 may include a central processing unit (CPU) or an application-specific integrated circuit (Application-Specific Integrated Circuit, ASIC), may include one or more integrated circuits configured to control program execution, may include a hardware circuit developed by using a field programmable gate array (Field Programmable Gate Array, FPGA), or may include a baseband chip.

The transmitter 703 may be configured to communicate with an external device.

The information sending device may further include a memory 701 that is also shown in FIG. 7. The memory 701 may be configured to store an instruction required by the processor 702 to execute a task, and may be further configured to store data.

There may be one or more memories 701. The memory 701 may include a read-only memory (Read-Only Memory, ROM), a random access memory (Random Access Memory, RAM), a magnetic disk memory, and the like.

The memory 701 and the transmitter 703 may be connected to the processor 702 by using a bus 700 (which is used as an example in FIG. 7), or may be separately connected to the processor 702 by using a dedicated connection cable.

The processor 702 is designed and programmed to permanently write code corresponding to the foregoing methods into a chip, so that when being operated, the chip can perform the methods described in the foregoing embodiments. How to design and program the processor 702 is a technology well known to a person skilled in the art. Details are not described herein.

The information sending device may be configured to perform the method provided in the embodiment shown in FIG. 2 or FIG. 4. Therefore, for a function and the like implemented by each unit in the information sending device, refer to the description in the method, and details are not described again.

Figure 8:
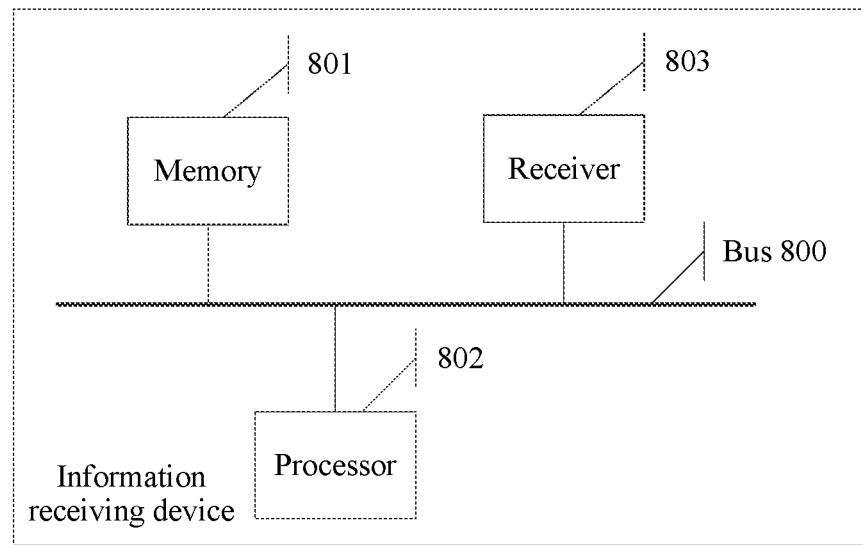
FIG. 8 is a schematic structural diagram of a first information receiving device according to an embodiment of the present invention.

Referring to FIG. 8, based on a same invention concept, a first information receiving device is provided. The device may be, for example, user equipment or a network device. The device may include a processor 802 and a receiver 803.

For example, the processor 802 may include a CPU or an ASIC, may include one or more integrated circuits configured to control program execution, may include a hardware circuit developed by using an FPGA, or may include a baseband chip.

The receiver 803 may be configured to communicate with an external device.

The information receiving device may further include a memory 801 that is also shown in FIG. 8. The memory 801 may be configured to store an instruction required by the processor 802 to execute a task, and may be further configured to store data.

There may be one or more memories 801. The memory 801 may include a ROM, a RAM, a magnetic disk memory, and the like.

The memory 801 and the receiver 803 may be connected to the processor 802 by using a bus 800 (which is used as an example in FIG. 8), or may be separately connected to the processor 802 by using a dedicated connection cable.

The processor 802 is designed and programmed to permanently write code corresponding to the foregoing methods into a chip, so that when being operated, the chip can perform the methods described in the foregoing embodiments. How to design and program the processor 802 is a technology well known to a person skilled in the art. Details are not described herein.

The information receiving device may be configured to perform the method provided in the embodiment shown in FIG. 6. Therefore, for a function and the like implemented by each unit in the information receiving device, refer to the description in the method, and details are not described again.

Figure 9:
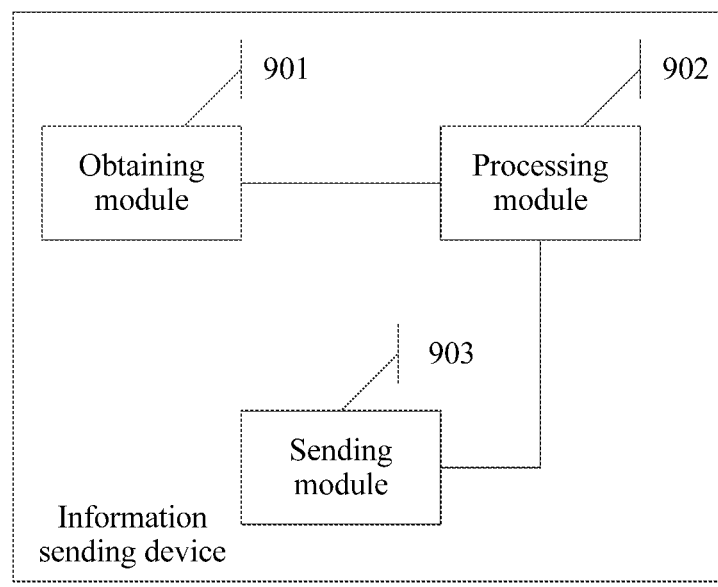
FIG. 9 is a schematic structural diagram of a second information sending device according to an embodiment of the present invention.

Referring to FIG. 9, based on a same invention concept, a second information sending device is provided. The device may include an obtaining module 901, a processing module 902, and a sending module 903.

In an actual application, entity devices corresponding to the obtaining module 901 and the processing module 902 may be the processor 702 in FIG. 7, and an entity device corresponding to the sending module 903 may be the transmitter 703 in FIG. 7.

The information sending device may be configured to perform the method provided in the embodiment shown in FIG. 2. Therefore, for a function and the like implemented by each unit in the information sending device, refer to the description in the method, and details are not described again.

Figure 10:
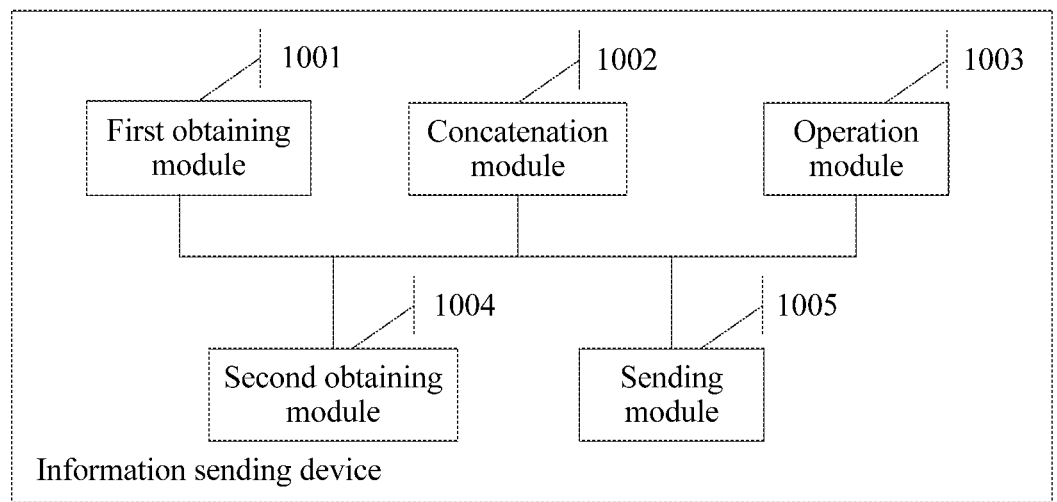
FIG. 10 is a schematic structural diagram of a third information sending device according to an embodiment of the present invention.

Referring to FIG. 10, based on a same invention concept, a third information sending device is provided. The device may include a first obtaining module 1001, a concatenation module 1002, an operation module 1003, a second obtaining module 1004, and a sending module 1005.

In an actual application, entity devices corresponding to the first obtaining module 1001, the concatenation module 1002, the operation module 1003, and the second obtaining module 1004 may be the processor 702 in FIG. 7, and an entity device corresponding to the sending module 1005 may be the transmitter 703 in FIG. 7.

The information sending device may be configured to perform the method provided in the embodiment shown in FIG. 4. Therefore, for a function and the like implemented by each unit in the information sending device, refer to the description in the method, and details are not described again.

Figure 11:
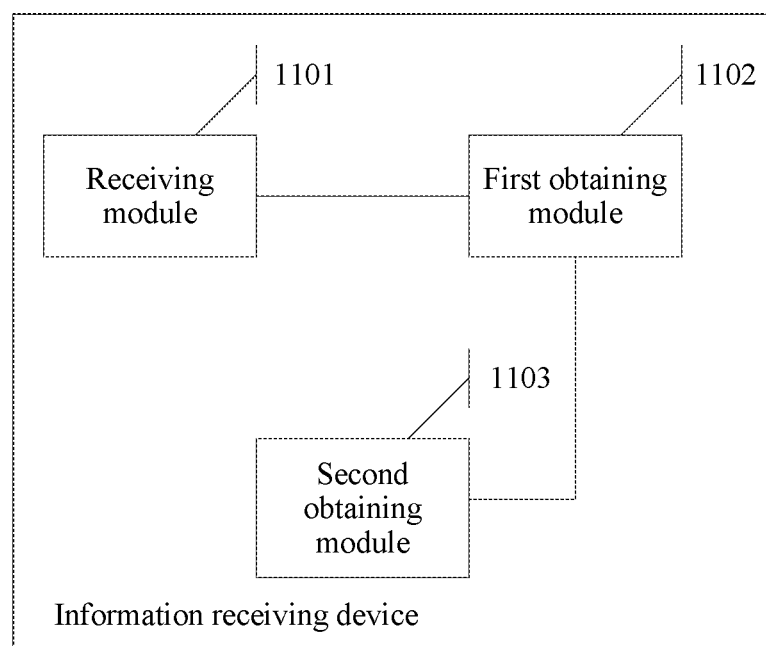
FIG. 11 is a schematic structural diagram of a second information receiving device according to an embodiment of the present invention.

Referring to FIG. 11, based on a same invention concept, a second information receiving device is provided. The device may include a receiving module 1101, a first obtaining module 1102, and a second obtaining module 1103.

In an actual application, an entity device corresponding to the receiving module 1101 may be the receiver 803 in FIG. 8, and entity devices corresponding to the first obtaining module 1102 and the second obtaining module 1103 may be the processor 802 in FIG. 8.

The information receiving device may be configured to perform the method provided in the embodiment shown in FIG. 6. Therefore, for a function and the like implemented by each unit in the information receiving device, refer to the description in the method, and details are not described again.

In the embodiments of the present invention, the M pieces of code block information belonging to the codeword may be processed to obtain the N layers of output bit information, and then the N layers of output bit information are modulated and mapped. Compared with a prior-art manner in which one piece of code block information is mapped to one resource element or adjacent resource elements, in the embodiments of the present invention, bits in a single piece of code block information may be mapped to resource elements that are more distributed, thereby improving a time domain diversity gain and/or a frequency domain diversity gain of code block mapping.

In the present invention, it should be understood that the disclosed device and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual needs to achieve the embodiments of the present invention.

Functional units in the embodiments of the present invention may be integrated into one processing unit, or each of the units may be an independent physical module.

When the integrated unit is implemented in the form of a software functional unit and sold or used as an independent product, the integrated unit may be stored in a computer readable storage medium. Based on such an understanding, all or some of the technical solutions of the present invention may be implemented in a form of a software product. The computer software product is stored in a storage medium and includes several instructions for instructing a computer device, which may be, for example, a personal computer, a server, or a network device, or a processor (processor) to perform all or some of the steps of the methods described in the embodiments of the present invention. The foregoing storage medium includes: any medium that can store program code, such as a Universal Serial Bus flash drive (Universal Serial Bus flash drive), a removable hard disk, a ROM, a RAM, a magnetic disk, or an optical disc.

The foregoing embodiments are merely used to describe the technical solutions of the present invention in detail. The foregoing embodiments are merely intended to help understand the method in the embodiments of the present invention, and shall not be construed as a limitation on the embodiments of the present invention. Any variation or replacement readily figured out by a person skilled in the art shall fall within the protection scope of the embodiments of the present invention.

What is claimed is:

1. A method of transmitting information, comprising:
   obtaining M pieces of to-be-sent code block information corresponding to one codeword, wherein M is a positive integer;
   performing, by a processor, the following processing on each of the M pieces of code block information to obtain N layers of output bit information, wherein N is an integer greater than 1:
      obtaining, based on the quantity N of layers corresponding to the M pieces of code block information and M, a quantity K of layers corresponding to the piece of code block information;
      obtaining a quantity of bits output after rate matching is performed on the piece of code block information; and
      obtaining K layers of output bit information of the piece of code block information based on the quantity of layers corresponding to the piece of code block information and the quantity of bits output after rate matching is performed on the piece of code block information;
   modulating the N layers of output bit information; and
   transmitting, by a communications interface, the modulated N layers of output bit information; and, wherein obtaining the quantity of bits output after rate matching is performed on the one piece of code block information comprises:
   obtaining, based on the quantity of layers corresponding to the one piece of code block information, a quantity of spatial multiplexing layers, a modulation order of one layer corresponding to the one piece of code block information, and a quantity of resource elements occupied by the codeword to which the one piece of code block information belongs, the quantity of bits output after rate matching is performed on the one piece of code block information.

2. The method according to claim 1, wherein the obtaining a quantity K of layers corresponding to one piece of code block information comprises:
   obtaining, based on the quantity N of layers corresponding to the M pieces of code block information and M, the quantity K of layers corresponding to the one piece of code block information.

3. The method according to claim 2, wherein the obtaining, based on the quantity N of layers corresponding to the M pieces of code block information and M, the quantity K of layers corresponding to the one piece of code block information comprises: obtaining, according to the following formula, the quantity K of layers corresponding to the one piece of code block information:

$$\begin{cases} \left\lfloor \dfrac{N}{M} \right\rfloor, & 0 \leq r \leq M - N \% M - 1 \\ \left\lceil \dfrac{N}{M} \right\rceil, & M - N \% M - 1 < r < N \end{cases},$$

wherein
r represents an index of the one piece of code block information.

4. The method according to claim 1, wherein the obtaining, based on the quantity of layers corresponding to the one piece of code block information, a quantity of spatial multiplexing layers, a modulation order of one layer corresponding to the one piece of code block information, and a quantity of resource elements occupied by the codeword to which the one piece of code block information belongs, the quantity of bits output after rate matching is performed on the one piece of code block information comprises: obtaining, according to the following formula, the quantity of bits output after rate matching is performed on the one piece of code block information:

$$E_r = K \cdot N_L \cdot Q_{SM} \cdot N_{RE}, \text{ wherein}$$

$E_r$ represents the quantity of bits output after rate matching is performed on the one piece of code block information, K represents the quantity of layers corresponding to the one piece of code block information, $N_L$ represents the quantity of spatial multiplexing layers, $Q_{SM}$ represents the modulation order of the one layer corresponding to the one piece of code block information, and $N_{RE}$ represents the quantity of resource elements occupied by the codeword to which the one piece of code block information belongs.

5. The method according to claim 1, wherein the obtaining K layers of output bit information of the one piece of code block information based on the quantity of layers corresponding to the one piece of code block information and the quantity of bits output after rate matching is performed on the one piece of code block information comprises: obtaining an $m^{th}$ layer of output bit information in the K layers of output bit information of the one piece of code block information according to the following formula, to obtain the K layers of output bit information, wherein m is an integer ranging from 0 to K−1:

$$B = \{b_{m+n \cdot K}\}, \text{ wherein}$$

B represents the $m^{th}$ layer of output bit information of the one piece of code block information, m represents an index of a layer corresponding to the one piece of code block information, m=0, ..., or K−1, $b_{m+n \cdot K}$ represents an $(m+n \cdot K)^{th}$ output bit to be mapped to an $m^{th}$ layer after rate matching is performed on the one piece of code block information, n=0, ..., or $$\frac{E_r}{K} - 1,$$

K represents the quantity of layers corresponding to the one piece of code block information, and $E_r$ represents the quantity of bits output after rate matching is performed on the one piece of code block information.

6. A communications apparatus, comprising:
a processor, configured to:
obtain M pieces of to-be-sent code block information corresponding to one codeword, wherein M is a positive integer;
perform the following processing on each of the M pieces of code block information to obtain N layers of output bit information:
obtain, based on the quantity N of layers corresponding to the M pieces of code block information and M, a quantity K of layers corresponding to the piece of code block information;
obtaining a quantity of bits output after rate matching is performed on the one piece of code block information; and
obtain K layers of output bit information of the one piece of code block information based on the quantity of layers corresponding to the one piece of code block information and the quantity of bits output after rate matching is performed on the one piece of code block information, wherein N is an integer greater than 1; and
modulate the N layers of output bit information; and
a communications interface, configured to send the modulated N layers of output bit information; and, wherein obtaining the quantity of bits output after the rate matching is performed on the one piece of code block information comprises:
obtaining, based on the quantity of layers corresponding to the one piece of code block information, a quantity of spatial multiplexing layers, a modulation order of one layer corresponding to the one piece of code block information, and a quantity of resource elements occupied by the codeword to which the one piece of code block information belongs, the quantity of bits output after the rate matching is performed on the one piece of code block information.

7. The communications apparatus according to claim 6, wherein that the processor is configured to obtain a quantity K of layers corresponding to one piece of code block information comprises:
obtaining, based on the quantity N of layers corresponding to the M pieces of code block information and M, the quantity K of layers corresponding to the one piece of code block information.

8. The communications apparatus according to claim 7, wherein that the processor is configured to obtain, based on the quantity N of layers corresponding to the M pieces of code block information and M, the quantity K of layers corresponding to the one piece of code block information comprises: obtaining, according to the following formula, the quantity K of layers corresponding to the one piece of code block information:

$$\begin{cases} \left\lfloor \frac{N}{M} \right\rfloor, & 0 \le r \le M - N \% M - 1 \\ \left\lceil \frac{N}{M} \right\rceil, & M - N \% M - 1 < r < N \end{cases},$$

wherein
r represents an index of the one piece of code block information.

9. The communications apparatus according to claim 6, wherein that the processor is configured to obtain, based on the quantity of layers corresponding to the one piece of code block information, a quantity of spatial multiplexing layers, a modulation order of one layer corresponding to the one piece of code block information, and a quantity of resource elements occupied by the codeword to which the one piece of code block information belongs, the quantity of bits output after rate matching is performed on the one piece of code block information comprises: obtaining, according to the following formula, the quantity of bits output after rate matching is performed on the one piece of code block information:

$$E_r = K \cdot N_L \cdot Q_{SM} \cdot N_{RE}, \text{ wherein}$$

$E_r$ represents the quantity of bits output after rate matching is performed on the one piece of code block information, K represents the quantity of layers corresponding to the one piece of code block information, $N_L$ represents the quantity of spatial multiplexing layers, $Q_{SM}$ represents the modulation order of the one layer corresponding to the one piece of code block information, and $N_{RE}$ represents the quantity of resource elements occupied by the codeword to which the one piece of code block information belongs.

10. The communications apparatus according to claim 6, wherein that the processor is configured to obtain K layers of output bit information of the one piece of code block information based on the quantity of layers corresponding to the one piece of code block information and the quantity of bits output after rate matching is performed on the one piece of code block information comprises: obtaining an $m^{th}$ layer of output bit information in the K layers of output bit information of the one piece of code block information according to the following formula, to obtain the K layers of output bit information, wherein m is an integer ranging from 0 to K−1:

$$B=\{b_{m+n\cdot K}\}, \text{ wherein}$$

B represents the $m^{th}$ layer of output bit information of the one piece of code block information, m represents an index of a layer corresponding to the one piece of code block information, m=0, . . . , or K−1, $b_{m+n\cdot K}$ represents an $(m+n\cdot K)^{th}$ output bit to be mapped to an $m^{th}$ layer after rate matching is performed on the one piece of code block information, n=0, . . . , or $$\frac{E_r}{K} - 1,$$

K represents the quantity of layers corresponding to the one piece of code block information, and $E_r$ represents the quantity of bits output after rate matching is performed on the one piece of code block information.

* * * * *